United States Patent
Stich et al.

(10) Patent No.: US 7,752,156 B2
(45) Date of Patent: Jul. 6, 2010

(54) SYSTEM AND METHOD FOR AUTOMATICALLY CREATING, INSTALLING AND CONFIGURING EXTENSIONS OF FUNCTIONALITIES IN THE SYSTEM NODES OF A DISTRIBUTED NETWORK

(75) Inventors: Christian M. Stich, Leutershausen (DE); Marcel Dix, Mannheim (DE)

(73) Assignee: ABB Research Ltd, Zurich (CH)

( * ) Notice: Subject to any disclaimer, the term of this patent is extended or adjusted under 35 U.S.C. 154(b) by 565 days.

(21) Appl. No.: 11/664,845

(22) PCT Filed: Dec. 20, 2005

(86) PCT No.: PCT/EP2005/013717

§ 371 (c)(1),
(2), (4) Date: Apr. 6, 2007

(87) PCT Pub. No.: WO2006/066881

PCT Pub. Date: Jun. 29, 2006

(65) Prior Publication Data

US 2008/0097947 A1    Apr. 24, 2008

(30) Foreign Application Priority Data

Dec. 20, 2004   (DE) .................. 10 2004 062 432

(51) Int. Cl.
*G06F 17/00* (2006.01)
*G06N 5/02* (2006.01)
(52) U.S. Cl. ....................................................... 706/50
(58) Field of Classification Search .................. 706/50
See application file for complete search history.

(56) References Cited

U.S. PATENT DOCUMENTS 6,151,643 A    11/2000   Cheng et al.
(Continued)

FOREIGN PATENT DOCUMENTS

DE    102 08 530 A1    9/2003
DE    103 56 348 A1    6/2005
(Continued)

OTHER PUBLICATIONS

Distributed, Automatic File Description Tuning in Peer-to-Peer File-Sharing Systems, Dongmei Jia; Wai Gen Yee; Linh Thai Nguyen; Frieder, O.; Peer-to-Peer Computing, 2007. P2P 2007. Seventh IEEE International Conference on Sep. 2-5, 2007 Page(s):167 - 176 Digital Object Identifier 10.1109/P2P.2007.22.*
International Search Report dated Jun. 8, 2006.
(Continued)

*Primary Examiner*—Michael B Holmes
(74) *Attorney, Agent, or Firm*—Buchanan Ingersoll & Rooney PC

(57) ABSTRACT

The invention relates to a system and to a method for automatically creating, installing and configuring extensions of functionalities in the system nodes of a distributed network, in particular in a distributed automatic system, provided with at least one system diagnosis tool which analyses the current state of the system of the distributed network and combines in system status data which is guided to at least one knowledge-based planning tool. The knowledge-based planning tool creates installation data for the novel system extensions which are based on control and data from the system status data and a planning data base and guides said installation data, respectively, to at least one installation and configuration tool, which is provided in the system nodes. The installation and configuration tool, of the respective system node automatically selects, from the installation data, the extension of the functionalities, which are to be installed, in the system nodes of the distributed network, installs and configures the latter, and enables, after the configuration of the installed software packets, the functionalities of the distributed network to be re-established.

20 Claims, 2 Drawing Sheets

U.S. PATENT DOCUMENTS

| | | | |
|---|---|---|---|
| 7,024,199 B1 * | 4/2006 | Massie et al. | 455/445 |
| 7,136,642 B1 * | 11/2006 | Massie et al. | 455/428 |
| 7,140,013 B2 * | 11/2006 | Te'eni et al. | 717/173 |
| 7,162,238 B1 * | 1/2007 | Massie et al. | 455/432.3 |
| 7,162,623 B2 * | 1/2007 | Yngvesson | 713/1 |
| 2002/0174264 A1 | 11/2002 | Fuller et al. | |
| 2003/0229890 A1 | 12/2003 | Lau et al. | |
| 2006/0259243 A1 * | 11/2006 | Bregulla et al. | 702/19 |

FOREIGN PATENT DOCUMENTS

| | | |
|---|---|---|
| EP | 0 703 531 A1 | 3/1996 |
| EP | 1 398 975 A1 | 3/2004 |
| WO | 01/93021 A2 | 12/2001 |

OTHER PUBLICATIONS

German Search Report dated Mar. 15, 2006 (with English translation of category of cited document).

* cited by examiner

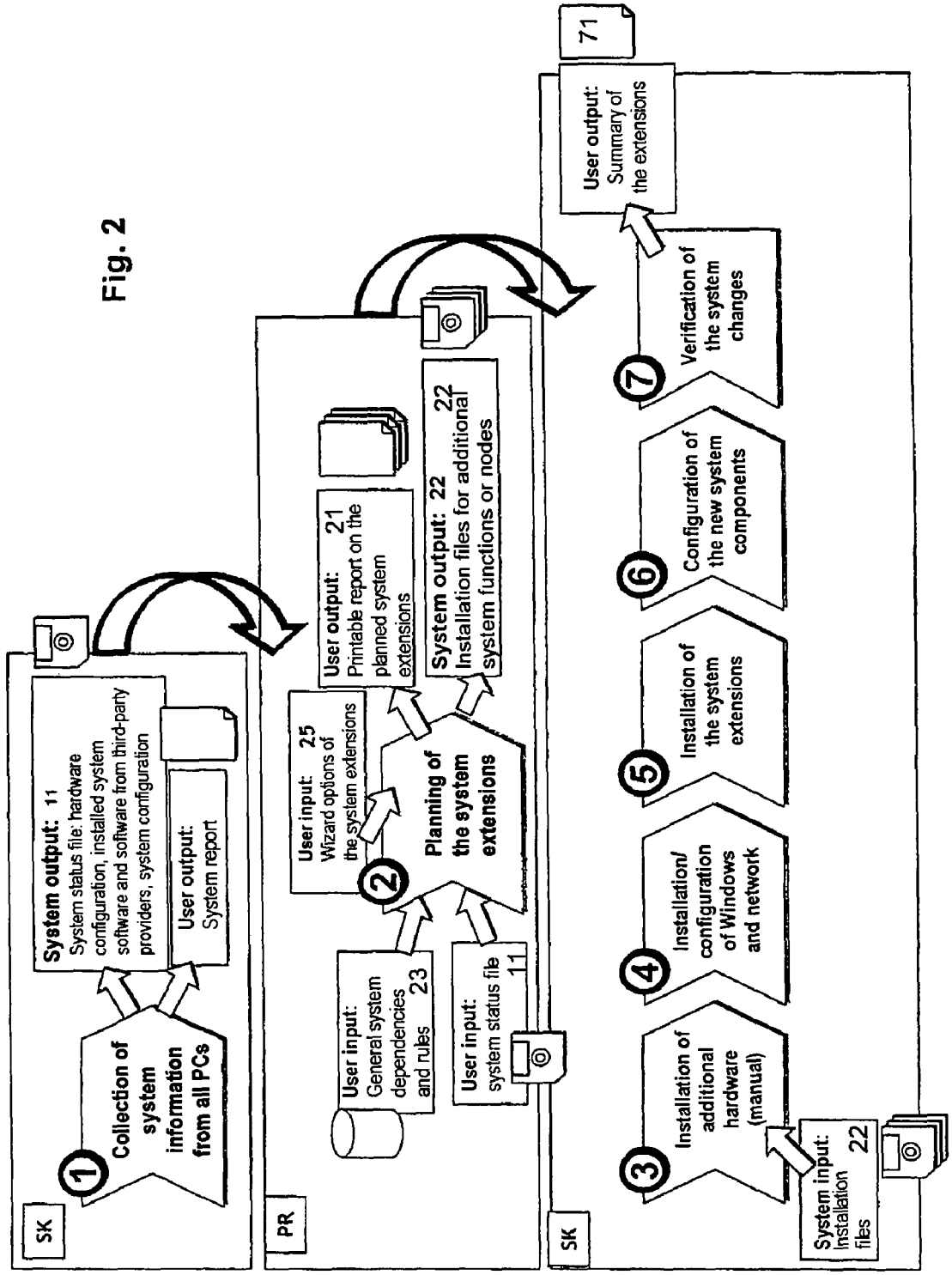

SYSTEM AND METHOD FOR AUTOMATICALLY CREATING, INSTALLING AND CONFIGURING EXTENSIONS OF FUNCTIONALITIES IN THE SYSTEM NODES OF A DISTRIBUTED NETWORK

The invention relates to a system and a method for automatically creating, installing and configuring extensions of functionalities in the system nodes of a distributed network, in particular in a distributed automatic system.

The structure of a distributed network comprises a multiplicity of system nodes which are interconnected via a network structure and are interrelated, for example in a client-server relationship, and provide functionalities which cannot be provided by means of an individual component. Operator stations, engineering stations, archiving stations, control devices with processing stations, input and output units and communications interfaces, for example, are used as system nodes in the distributed network.

The functional components are normally distributed among a multiplicity of system nodes, also referred to below as a computer or data processing device, which are interconnected via one or more physical networks. Operating systems, application programs, control programs and various functional components of the system are installed on the system nodes, whereby the individual nodes with their various functional components are dependent on one another in different ways.

In order to extend the functionalities contained in software packages, also referred to as system extensions, additional software components, for example, or topological extensions, such as additional system nodes or network characteristics, are installed separately in the system nodes of the distributed network.

Methods currently employed use, for example, installation programs, referred to as software installers, which run correspondingly available extension facilities of the existing software for each individual computer of the distributed network. Prior to the installation of the new programs, these installation programs check the existing software configuration on the respective system node and, in the event of a re-installation, suggest alternatives according to the available extension facilities of the software on the respective system nodes.

A detailed knowledge of the dependencies between the individual system nodes is required in order to take into account the dependencies between the individual system nodes of the distributed automatic system when extensions of functionalities are created, installed and configured.

Installation manuals often offer only a general knowledge of the existing dependencies between the distributed system software. The planning of the system extensions and the identification of a correct installation sequence must be carried out manually by the user.

Comprehensive expert knowledge is required for creating and installing extensions of the functionalities in the distributed network and for configuring the relationships and dependencies between the individual system nodes, since the procedure for installing and configuring the software packages is often only inadequately described and is difficult to follow in the guidelines and instructions prescribed for that purpose.

No dependency rules can be formulated for planning extensions of the functionalities of the distributed network.

Although different extension facilities are offered for the respective distributed network, the user must manually resolve dependencies or conflicts between the individual system components.

The system structure plans and the identification of the system components for a complete and correct installation of the interrelationships and interdependencies of the system components are also manually created and checked separately for each system component, whereby the administrative effort involved in extending the software packages is highly time-consuming and increases in proportion to the scope of the system topology.

An automatic system extension of the entire distributed network cannot be carried out with the methods currently employed.

The object of the invention is therefore to indicate a system for automatically creating, installing and configuring extensions of the functionalities in the system nodes of a distributed network, in particular in a distributed automatic system, whereby the aforementioned disadvantages are avoided.

Advantageous designs, improvements of the system according to the invention and a corresponding method for implementing a system of this type are indicated in further claims and in the description.

The extension of the functionalities, also referred to below as system extensions, comprises, for example, the following functionalities:

additional operator stations and engineering stations,
the support of further system applications and additional application servers,
the support of further field bus technologies,
the support of redundancies for existing servers or network components, and
the support of further controller types.

According to the invention, the system for automatically creating, installing and configuring extensions of functionalities in the system nodes of a distributed network, in particular in a distributed automatic system, comprises a system diagnosis tool which analyzes the current system status of the distributed network by iterating system diagnosis functions of the system diagnosis tool via the individual system nodes in the distributed network and by analyzing them for existing system components of the system nodes.

In order to analyze the current system status, the system diagnosis tool collects the system-related data of the distributed automatic system via the system nodes, for example by means of an analysis tool, and summarizes the collected data in the system status file. The system information collected in this way forms the basis for the implementation of the extensions of the functionalities by means of a knowledge-based planning tool.

For the extension of the functionalities of the distributed network, the analysis tool identifies the system functions which are supported by the currently installed system and the topography which the network comprises (e.g. how many operator stations and servers the network has), so that extension possibilities can be identified and planned specifically for this system with its characteristics. The analysis tool identifies, for example, the software and hardware which are installed on each individual system node in the network, for which purpose it iterates via the individual computers in order to identify the existing functionalities.

The knowledge-based planning tool generates rule-based and data-based installation files from the system status file and a planning database for automatically installing and configuring the extensions of the functionalities in the system nodes of the distributed network, in that the planning tool automatically determines the installations and configurations on the system additionally required for the planned system extensions and transfers this information in a specific format into corresponding installation files which are read by the downstream tools and automatically executed.

To do this, the planning tool resolves logical dependencies between the system nodes and functionalities of the distributed automatic system and between the possible system extensions from the database and thus ensures in an advantageous manner that system extensions which violate dependency rules with the characteristics of the installed system are not offered by the planning tool as an option. This would be the case, for example, if the installed automatic system had already reached the maximum number of system nodes permitted by the planning rules of the planning database. No further operator stations can then be added to the system. If a specific system function may not exist together with a function already installed, this system function cannot then be added. The planning tool thus ensures that only valid system extensions are planned, installed and configured.

The planning tool generates installation files for automatically installing and configuring the system extension on the basis of the system extensions previously selected from the planning database and the system status files.

To do this, the planning tool is preferably stored in a separate planning computer and, from the system components, automatically constructs a complete system configuration which matches the configuration of the installed system and has the same system functionalities. The planning database stored in the planning tool for this purpose comprises a model of possible system extensions with planning rules, definitions of the system nodes, system dependencies, for example interdependencies of the software packages, system information, for example definitions of the system node types, possible configuration combinations of the system components and/or system restrictions, minimum and maximum system limit information, for example a definition of the maximum number of operator stations, system installation requirements and system configuration steps.

The planning operates on the planning database, comprising the planning and the underlying planning data, together forming a knowledge-based system.

The installation files preferably comprise information on the node type and name of each system node, configuration changes, the required operating system, requirements for external basic software, additional hardware requirements, additional system components, depending on the respective system node type and the new system extensions to be installed, a compilation of software packages to be installed depending on the respective system node and/or configuration data of the system nodes.

The created installation files are in each case forwarded to an installation and configuration tool present in the system nodes, which automatically selects from the installation files, installs and configures the software packages to be installed.

Following the configuration of the installed software packages, the functionality and the system characteristics of the distributed network are advantageously extended by additional functionalities, in particular
  additional operator stations and engineering stations,
  the support of further system applications and additional application servers,
  the support of further field bus technologies,
  additional support of redundancies for existing servers or network components, and/or
  support of further controller types.

Following successful automatic installation of the software packages with the system extensions in the system nodes of the distributed network, the system nodes are automatically configured and the previously backed-up application data of the automatic system or the technical installation can be reloaded onto the new system.

In an alternative design variant, the configuration of the software packages can also be performed in a user-controlled manner.

A further design variant of the invention is based on the principle that the analysis tool determines the installation of additional hardware in the system nodes of the distributed network. To do this, the analysis tool reads in the corresponding generated installation files from the planning tool, compares these with the current hardware and generates, for example, a report on hardware that is to be additionally installed.

In a further advantageous design of the invention, the analysis tool is provided in order to automatically carry out verification of the functionality of the distributed network and/or generate a system status report.

According to another aspect of the invention, the current system status of the distributed network is analyzed by means of a system diagnosis tool and compiled in a system status file. The system status file is forwarded to a knowledge-based planning tool, preferably installed on a planning computer.

According to the invention, installation files are generated from the system status file and a planning database by means of the knowledge-based planning tool for automatically installing and configuring the system extensions, and the installation files are forwarded in each case to an installation and configuration tool present in the system nodes.

New software packages that are to be installed are automatically selected from the installation files, installed and configured by means of the installation and configuration tool of the respective system node with the system extensions with the corresponding system software, so that, following the configuration of the installed software packages, the functionality of the distributed network is extended by the additional system components.

The procedure for installing and configuring additional functionalities as system extensions on an existing distributed automatic system is carried out in an advantageous manner with the method according to the invention. The method automates the installation of the system extensions and optionally comprises an automatic system diagnosis of the existing automatic system. The system diagnosis analyzes the individual system nodes for system functionalities already installed and from this generates a status report on the entire network.

The method described thus enables automatic extension of the distributed network by additional functionalities.

In an advantageous manner, no expert knowledge is required for the automatic installation and configuration of the system extensions, since the installation and configuration of the system extensions are carried out automatically for all system nodes of the distributed network.

The invention and advantageous designs and improvements of the invention are explained in detail and described with reference to the example embodiment shown in FIGS. 1 and 2, in which:

FIG. 2 shows an example of a typical process for automatically creating, installing and configuring extensions of functionalities stored in software packages for a system node arranged in an automatic system.

Figure 1:
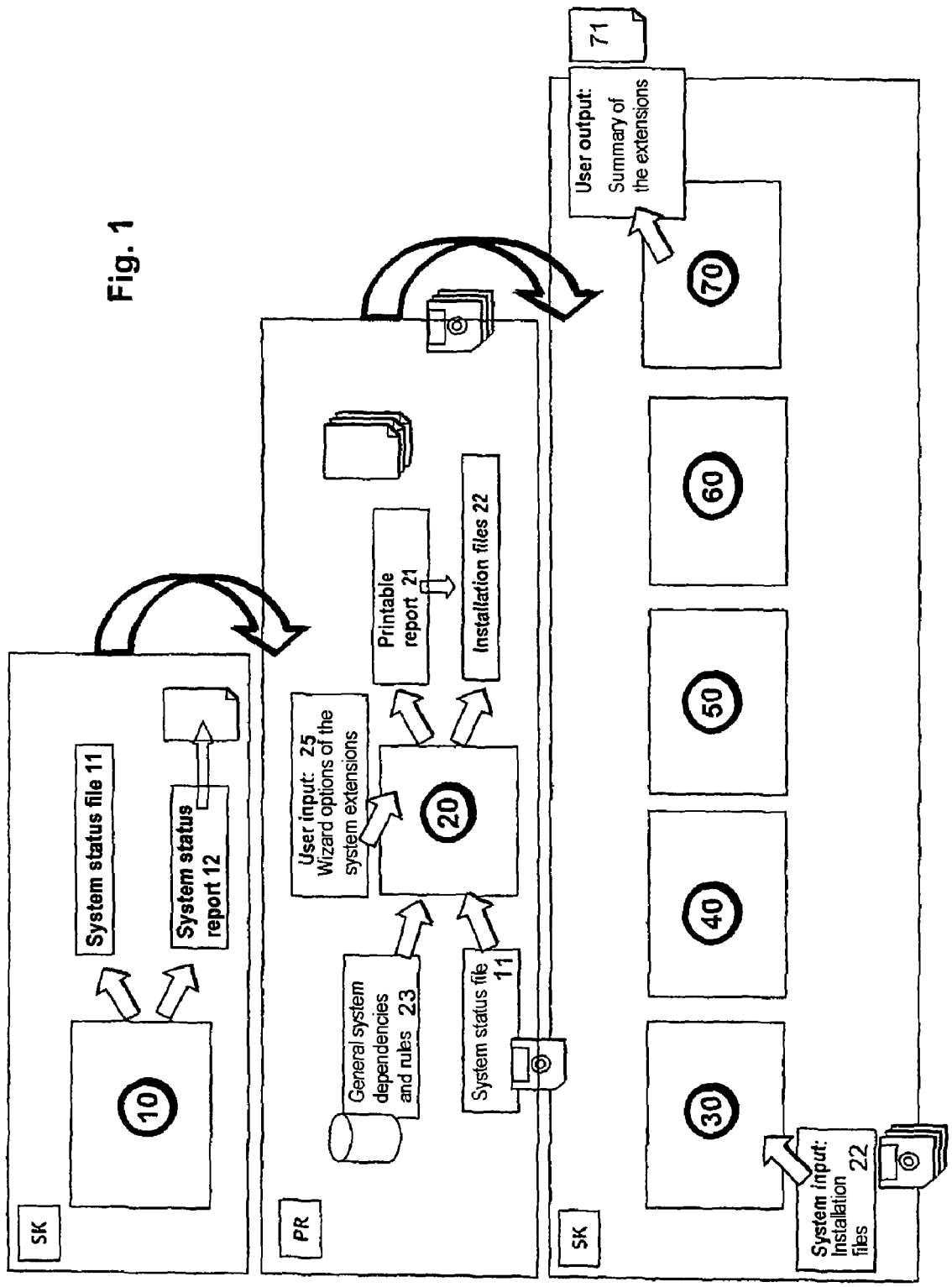
FIG. 1 shows a design form of the system according to the invention for automatically creating, installing and configuring extensions of functionalities stored in software packages for a system node arranged in an automatic system.

FIG. 1 shows an example of a design form of the system according to the invention for automatically creating, installing and configuring extensions of the functionalities in the system nodes of a distributed automatic system. The functionalities are stored in system nodes, for example operator stations, engineering stations, archiving stations and controllers with processing stations, input and output units and communications interfaces. Only one system node SK is shown as an example in FIG. 1.

The functionalities integrated in the software packages are, in particular, operating systems, application programs, control programs and/or functional components of the automatic system.

A system diagnosis tool 10 is stored in the system nodes SK of the system according to the invention for automatically creating, installing and configuring extensions of the functionalities stored in software packages in a distributed automatic system. The system diagnosis tool 10 analyzes the current system status of the automatic system by collecting the system-related data of the automatic system by means of an analysis tool via the system nodes SK of the distributed automatic system, and by generating a system status file 11 from the current system status. The system status file 11 is forwarded to a knowledge-based planning tool 20, which is arranged in a separate planning computer.

A status report 12 on the current overall system is generated by means of the analysis of the individual system nodes SK to identify system functionalities already installed. The status report 12, which is contained in the system status file, records the functionalities that are present in the currently installed system. The planning tool 20 requires this information in order to identify the functionalities that are already available in the system and the possibilities offered for extension by additional functionalities.

The knowledge-based planning tool 20 creates installation files 22 from the system status file 11 and the rules and dependency information from a planning database 23 for automatically installing and configuring the system extension for the system nodes SK of the distributed automatic system.

In an alternative design variant, the configuration of the software packages can also be carried out in a user-controlled manner. The described method thus enables the automatic extension and re-commissioning of the distributed automatic system with its new additional functionalities.

The created installation files 22 are forwarded in each case to an installation and configuration tool 50, 60 present in the system nodes SK, which automatically selects from the installation files 22 and installs the software packages to be installed with the extensions of the functionalities, thereby extending the overall automatic system by the additional functionalities.

In an advantageous design of the invention, the analysis tool 70 automatically performs a verification of the functionality of the automatic system on the individual system nodes SK. With this final verification, the successful extension of the automatic system is concluded.

To do this, the analysis tool 70, which has already previously collected the system-related data of the automatic system via the system nodes SK of the distributed network, checks the completeness of the performed system extension on all system nodes and creates a new status report 71 with the information on the system extension and the new system status of the distributed automatic system. This report 71 forms, for example, as a system pass, the basis for future service activities and system extensions on the automatic system.

Before the new system software is set up, the hardware of the individual system nodes SK must often be adapted to the additional requirements of the planned system extensions.

The analysis tool 70 is thus also provided to ascertain, from the planning tool 20, required extensions and/or adaptations of the hardware of the respective system nodes SK of the distributed system by means of the generated installation files 22.

The analysis tool 70 alerts the user automatically to any new hardware requirements of the individual system nodes SK which have not been met. To do this, the analysis tool reads in the corresponding generated installation files 22 from the planning computer PR, and compares the files 22 with the currently installed hardware. The ascertained hardware extensions are output or indicated, for example, in the form of a report 30 on additional hardware requirements.

For the installation and configuration of the operating system and network, the generated installation files 22 receive so-called individual scripts for each system node SK for the automatic installation and configuration of the operating system and network. This automatically ensures, for example, that the correct operating system is pre-installed on the individual servers or clients of the system. Further scripts set, for example, the names of the system nodes SK and identification addresses of the system nodes, and add them to the corresponding system domain. The scripts are automatically activated here by a tool 40.

FIG. 2 shows an example of the procedure for automatically creating, installing and configuring extensions of the functionalities in the system nodes of a distributed automatic system.

The method according to the invention describes a number of steps with which the extension, installation and configuration of the functionalities in the distributed automatic system are carried out and all required information is compiled for the extension of the extended system functionality in a plurality of the installation files 22. The installation files 22 are used as input for the subsequent steps of the method and an individual set of defined node-specific files is generated for each node.

In a first step 1, the system-related data is collected by the analysis tool 70 via all system nodes SK in the distributed network. To do this, the analysis tool 70 iterates via the individual nodes SK and determines the hardware present therein, for example the performance of the central unit (CPU), or the memory capacity of the system nodes SK, the installed system software, the software from third-party providers, such as the operating system, the configurations of the system nodes SK, such as, for example, the identification address, the node name, the user access set-up and software configurations. The individual nodes are analyzed remotely from a central planning computer PR of the automatic system, which collates the results of the analysis and summarizes them in a system status file 11.

In a second step 2, the planning tool 20 reads in the generated system status file 11 and initializes all available system options into a graphical user interface (GUI) provided in the planning tool 20 with the current system characteristics. For example, the system applications already available are preselected in a list of selectable system applications. The planning tool 20 compares the functionalities available on the automatic system with the general system dependencies and rules from the planning database and determines the available extensions for the automatic system which do not result in a software conflict or rule violation. Extension options which are not available are thus automatically blocked in the GUI of the planning tool 20, and these extensions cannot be accessed.

Furthermore, the user has the optional facility to select and plan further functionalities for the system nodes SK of the automatic system in the GUI.

Furthermore, the planning tool is designed in such a way that it generates a set of installation files for the automatic installation and configuration of the planned system extensions for each system node.

Before the new system components can be set up, the hardware of the individual system nodes SK may need to be adapted according to the requirements of the new components. Thus, in a third step 3, the extension and/or adaptation of the hardware of the system nodes SK is prepared in that the user is automatically alerted by the analysis tool 70 to any new hardware requirements of the individual system nodes SK which may not have been met. To do this, the analysis tool 70 reads in the corresponding generated installation files 22 from the planning tool 20 and automatically compares these with the current hardware, whereby the system node SK computers can of course only be upgraded manually.

For the installation and configuration of the operating system and the network, so-called individual scripts are allocated in a fourth step 4 to the generated installation files 22 for each system node SK for the automatic installation and configuration of the operating system and the network. Thus, it is automatically ensured, for example, that the correct operating system is pre-installed on the individual servers or clients of the system. The scripts are automatically activated here by a tool 40.

The installation of new software components on the individual system nodes SK and/or the installation of new software nodes is carried out in a fifth step 5 in such a way that an installation tool 50 then identifies the new software packages which are to be installed from the installation files 22 and installs the new software packages, which are supplied, for example, by an installation CD, according to a predefined sequence on the individual system nodes. New planned system nodes are added by the installation tool 50 completely to the existing components, whereas, for existing system nodes, the tool installs only the system extensions which are to be added.

The originally installed system software packages of the individual system nodes SK are thus supplemented by means of the installation tool 40 with the extensions of the functionalities in such a way that the functionality of the entire automatic system is extended by the planned additional functionalities.

In a further step 6, the newly installed functionalities are automatically configured by means of a configuration tool 60 for the extended system, and are thus logically added to the system.

In an alternative design variant, the configuration of the functionalities can also be carried out in a user-controlled manner.

In a final step 7, a concluding verification of the successful extensions of the automatic system is carried out. To do this, the completeness of the performed steps 1 to 6 is checked by means of the analysis tool and a new system status report 71 is generated with the performed system extensions and the new system status. The system status report 71 is used, for example, as a system pass for future service activities on the distributed automatic system, in particular for further system extensions.

The invention claimed is:

1. A system for automatically creating, installing and configuring extensions of functionalities in system nodes of a distributed automatic system, the system comprising:
   at least one system diagnosis tool;
   at least one knowledge-based planning tool; and
   at least one installation and configuration tool;
   wherein the at least one system diagnosis tool stored in one of the system nodes analyzes the current system status of the distributed automatic system by iterating system diagnosis functions of the system diagnosis tool via the individual system nodes in the distributed automatic system and by analyzing existing system components of the system nodes, summarizes the current system status of the distributed automatic system in a system status file and forwards the system status file to the at least one knowledge-based planning tool;
   wherein the knowledge-based planning tool stored in a separate planning computer generates rule-based and data-based installation files from the system status file and a planning database, the installation files being for automatically installing and configuring the extensions of the functionalities in the system nodes of the distributed automatic system,
   wherein the knowledge-based planning tool forwards the installation files to at least one installation and configuration tool; and
   wherein the installation and configuration tool automatically selects from the installation files for the respective system nodes, installs and configures the extensions of the functionalities to be installed in the respective system nodes of the distributed automatic system.

2. The system as claimed in claim 1, wherein the extensions of the functionalities relate to system software integrated into software packages, the system software comprising functional components that include at least one of application programs and control programs of the distributed automatic system.

3. The system as claimed in claim 1, wherein the system diagnosis tool collects system-related data via the system nodes of the distributed automatic system in order to record the current system status using an analysis tool and summarizes said system-related data in the system status file.

4. The system as claimed in claim 3, wherein the analysis tool automatically performing at least one of carrying out a verification of the functionality of the distributed automatic system and generating a status report with information relating to the extensions of the functionalities of the distributed automatic system.

5. The system as claimed in claim 3 wherein the analysis tool determines at least one of necessary extensions and adaptations of hardware of the system nodes of the distributed automatic system.

6. The system as claimed in claim 1, wherein the planning database comprises a model of possible system extensions with at least one of planning rules, system dependencies, system node types, system limit information, system information, system installation requirements and system configuration steps.

7. The system as claimed in claim 1, wherein the system diagnosis tool and the installation and configuration tool are arranged in the system nodes of the distributed automatic system.

8. The system as claimed in claim 1, wherein the installation files comprise information relating to at least one of node type and name of each of the system nodes, the operating system, configuration changes, requirements for external basic software, additional hardware requirements, additional system components depending on the node type of the respective system nodes and the extensions of the functionalities to be installed, a compilation of software packages in the extensions of the functionalities to be installed depending on the node type of the respective system nodes and configuration data of the system nodes.

9. The system as claimed in claim 1, wherein, following the configuration of the extensions of the functionalities that are installed as software packages, the system characteristics and functionalities of the distributed automatic system are extended by at least one of additional system components which include at least one of additional operator stations and engineering stations, support of further system applications and additional application servers, support of further field bus technologies, additional support of redundancies for existing servers or network components, and support of further controller types.

10. The system as claimed in claim 1, wherein the configuration of the extensions of the functionalities that are installed as software packages can be carried out in a user-controlled manner.

11. A method for automatically creating, installing and configuring extensions of the functionalities in the system nodes of a distributed automatic system, the method comprising:
analyzing current system status of the distributed automatic system using a system diagnosis tool by iterating system diagnosis functions of the system diagnosis tool via the individual system nodes in the distributed automatic system and by analyzing existing system components of the system nodes, wherein the system diagnosis tool summarizes the current system status of the distributed automatic system in a system status file and forwards the system status file to a knowledge-based planning tool,
generating rule-based and data-based installation files from the system status file and a planning database using the knowledge-based planning tool for automatically installing and configuring the extensions of the functionalities in the system nodes of the distributed automatic system,
forwarding the installation files to an installation and configuration tool provided in the system nodes,
automatically selecting from the installation files that comprise software packages to be installed for the respective system nodes, installing and configuring in the respective system nodes based on the selected installation files using the installation and configuration tool.

12. The method as claimed in claim 11, wherein functional components of the system which include at least one of application programs and control programs of the distributed automatic system are stored in the software packages.

13. The method as claimed in claim 11, wherein system-related data are collected via the system nodes of the distributed automatic system and summarized in the system status file by the system diagnosis tool in order to record the current system status.

14. The method as claimed in claim 13, comprising:
verifying functionality of the distributed automatic system using at least one of an analysis tool and a status report that is generated with information relating to the extensions of the functionalities of the distributed automatic system.

15. The method as claimed in claim 13, comprising:
determining at least one of necessary extensions and adaptations of hardware of the system nodes of the distributed automatic system using the analysis tool.

16. The method as claimed in claim 11, wherein a model of possible system extensions with at least one of planning rules, interdependencies of the software packages, definitions of the system node types, configuration combinations and system restrictions is stored in the planning database.

17. The method as claimed in claim 11, wherein the system diagnosis tool and the installation and configuration tool are arranged in the system nodes of the distributed automatic system.

18. The method as claimed in claim 11, comprising:
storing information relating to at least one of node type and name of each of the system nodes, required operating system, configuration changes, requirements for external basic software, additional hardware requirements, additional software components depending on the node type of the respective system nodes of the extensions of the functionalities to be installed, a compilation of the software packages to be installed depending on the respective system nodes and configuration data of the system nodes in the installation files.

19. The method as claimed in claim 11, wherein, following the system extension, the system characteristics and functionalities of the distributed automatic system are extended by additional functionalities which include at least one of additional operator stations and engineering stations, support of further system applications and additional application servers, support of further field bus technologies, additional support of redundancies for existing servers or network components and support of further controller types.

20. The method as claimed in claim 11, wherein the configuration of the installed software packages is carried out in a user-controlled manner.

* * * * *